March 8, 1966    J. M. BRANDSTADTER    3,238,849
LINEAR ACTUATOR
Original Filed March 27, 1961
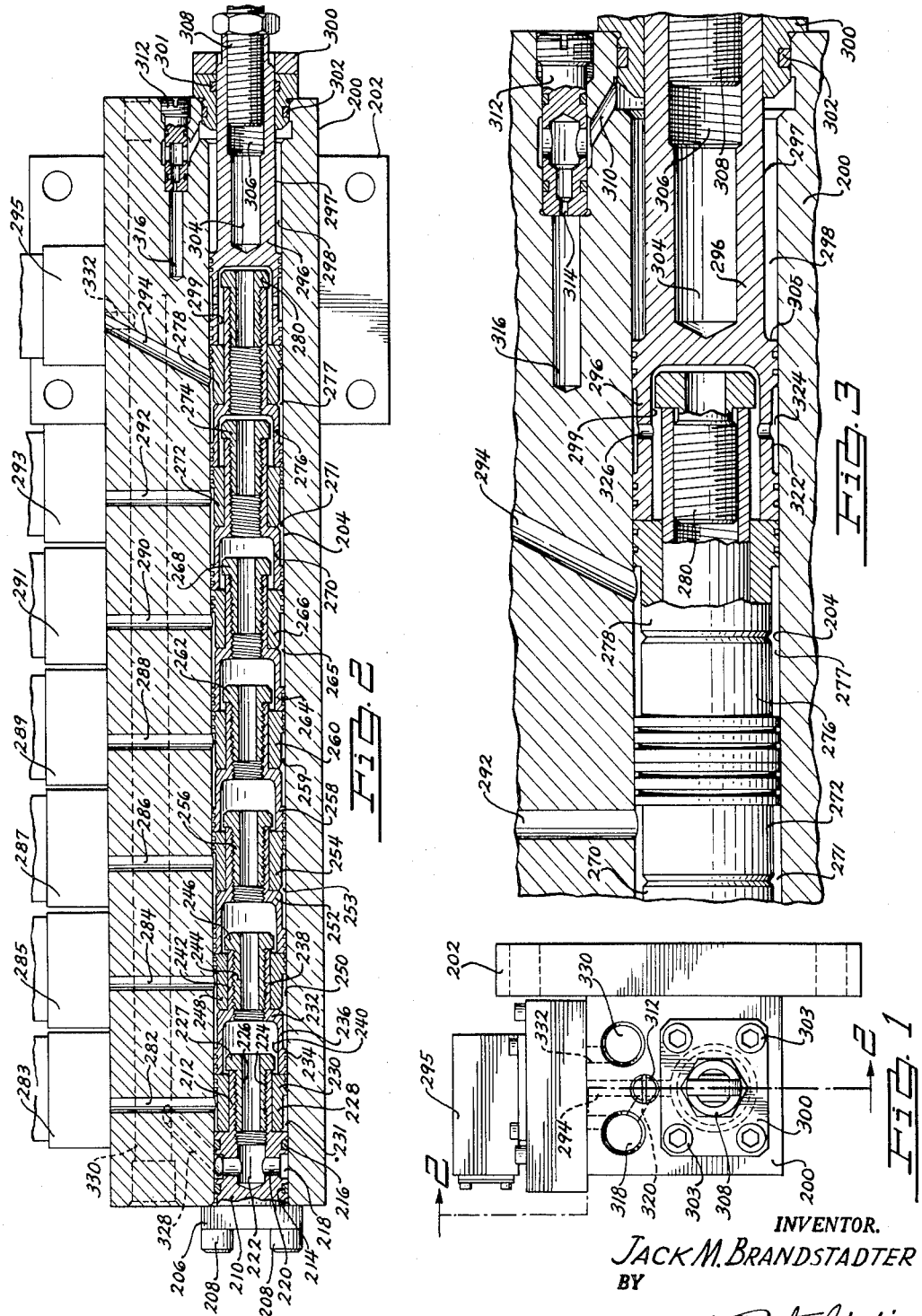
INVENTOR.
JACK M. BRANDSTADTER
BY
Bower & Patalidis
ATTORNEYS United States Patent Office 3,238,849
Patented Mar. 8, 1966

3,238,849
LINEAR ACTUATOR
Jack M. Brandstadter, Royal Oak, Mich., assignor to
Cadillac Gage Company, Roseville, Mich.
Original application Mar. 27, 1961, Ser. No. 98,549, now
Patent No. 3,141,388, dated July 21, 1964. Divided
and this application Dec. 13, 1963, Ser. No. 347,637
8 Claims. (Cl. 91—167)

The present application is a division of application Serial No. 98,549, now Patent No. 3,141,388.

This invention relates to improvements in linear actuators, and more particularly relates to servo-mechanisms for linearly positioning a shaft by fluid means in response to selective input signals.

In the art of data processing, digital computers, machine-tools, automation, and the like, there exists a need for devices which accurately position a shaft or a movable reference output element in response to information applied to the input of the device. Various servo-mechanisms of this nature have been proposed; they may be actuated by electrical means or by purely mechanical means. It is an object of this invention to provide a linear shaft actuator and positioner which is selectively operated by fluid pressure means. The fluid may be oil, water, compressed air, a gas, steam, or any other like fluid.

The transmission of control information in systems of the character herein mentioned is commonly carried out in the binary numerical system. It is frequently desirable to convert the digital representation of the binary number into an analogue equivalent such as the linear position of a movable reference output element or an angular shaft rotation. It is, therefore, another object of this invention to provide selectively operable fluid motor means for converting a binary information into an analogue equivalent in the form of a linear shaft position. It is apparent to those skilled in the art that such an analogue linear displacement and positioning can be easily converted, in applications where so desired, into an angular shaft rotation and positioning through a simple rocker arm assembly, rack and pinion assembly, or the like.

It is a further object of this invention to provide a compact, self-contained, fluid motor powered binary to linear shaft position converter.

It is another object of this invention to provide a linear actuator utilizing a relatively small number of simple elementary identical parts in order to reduce manufacturing cost and inventory.

It is an additional object of this invention to provide a linear actuator developing a great power with practically no lag in operation and almost instantaneous response.

It is a further object of this invention to provide a linear actuator having a number of discrete positions which correspond to the formula $N=2^n$, in which N denotes the number of discrete positions and $n$ denotes the number of individual unit elements being placed in series within a common housing. For example, if it is desired to provide for 8 different discrete positions of the output reference element, the number of unit elements or stages to be used is 3; if 128 discrete positions are required, 7 unit elements, or stages, must be placed within the housing.

A further object of this invention is to have a predetermined number of discrete positions which are accurately repeatable ad infinitum, together with positive indexing at each discrete position.

Still a further object of this invention is to provide a linear actuator which has a response time that can be tailored according to the requirements of the controlled equipment and which has positive dampening of the acceleration and deceleration of the movable shaft.

An additional object of this invention is to provide a device which can utilize readily available pressure fluid hardware, tubings, valves, accumulators, and the like.

Another object is to provide a functional unit endowed with high reliability and long life.

Additional objects and advantages of the invention will become apparent from the following description and appended claims, taken in connection with the accompanying drawings, which disclose, by way of example, the principles of this invention and some of the best modes which have been contemplated of applying these principles.

In the drawings:

FIG. 1 is an end elevation view of a linear positioner embodying the principles of this invention;

FIG. 2 is a longitudinal elevation view, partly in cross-section, with some of the elements broken away, and taken along line 5—5 of FIG. 1; and FIG. 3 is a partial view, similar to FIG. 2, but showing some of the component parts at a larger scale for more clarity.

In the example of the invention illustrated by FIGS. 1–3, there is shown an embodiment of the invention, using the same principles, but having a configuration somewhat different from the structures disclosed in co-pending application Serial No. 347,638 and in Patent No. 3,141,388.

The main bore in the housing contains seven separate stages. Seven transfer valves are mounted on the housing. Each valve actuates one stage by admitting an exhausting fluid pressure to and from the corresponding stage.

Each stage consists of two main members slidably disposed end to end directly in the housing bore. When fluid pressure is introduced between the two members, this causes them to separate. Because the first member is in contact with the preceding stage assembly, or is a fixed member in the case of the first stage, only the second member can be displaced, pushing at the same time all the stages between it and the output shaft. The stroke of the moving member is limited by an abutment on a fixed reference member. In this way, each stage displaces the output shaft the exact amount of that stage stroke, and a combination of stages displaces the output shaft the sum of the strokes of the stages being utilized. The stroke of each stage is twice the stroke of the immediately preceding stage. In this fashion, with seven stages as shown, there are one hundred twenty-eight discrete positions available at the output.

All the stages are loaded towards their retracted position by supply fluid pressure acting upon a partial area of a reaction member. When this fluid is exhausted during expansion of the actuator, or when it is introduced into the housing during contraction of the actuator, the fluid must pass through an interchangeable fitting provided with a calibrated throttling port, thereby affording a means to tailor the response time of the device in function of the needs of the output.

Referring now in more detail to FIGS. 1–3, which represent an example of an embodiment of the invention, a housing 200, provided with a mounting bracket 202, has a main bore 204 closed on one end by an end cap 206 fastened thereon by bolts or cap screws 208. This end cap is provided with an elongated cylindrical integral undercut portion 210 projecting within the bore 204 and having a stepped reduced diameter integral projection 212. The outside diameter of undercut portion 210 is equal to the inside diameter of bore 204 and has two circular grooves in which are placed two O-ring seals 214 and 216. Intermediate the two O-ring seals there is a wider groove 218 defining an annular chamber therein communicating through cross-drilled passageways 220 with inner bore 222 extending all the way to the end of the stepped reduced portion 212. This inner bore 222 has a thread 224 adapted to receive a hollow threaded stop member 226 having a head 227. A primary sleeve 228 is slidably mounted around the stepped integral projection 212 and has an outwardly extending grooved shoulder 230 having a diameter allowing a lap fit with main bore 204. An annular chamber 231 is thus defined between the reduced diameter of primary sleeve 228 and the bore 204 of the housing. The length of primary sleeve 228 is slightly less than the length of stepped integral projection 212, the difference between the two lengths being arbitrarily called $a$ for the sake of simplifying the subsequent description of the operation of the device. This difference in lengths determines the amount of permissible stroke $a$ of primary sleeve 228.

Immediately adjacent primary sleeve 228, and alined therewith within the bore 204, secondary sleeve 232 has three outer diameters of decreasing dimensions; grooved shoulder diameter 234 which is a lap fit to the bore 204, diameter 236 substantially identical to the smaller diameter of primary sleeve 228, and diameter 238 substantially identical to the outside diameter of integral projection 212. Secondary sleeve 232 has a two-step inner bore: a substantially large bore 240 adapted to clear the head 227 of hollow threaded stop member 226 and a smaller bore with a thread 242 adapted to receive a second hollow threaded stop member 244 having a head 246. On the outside diameter 238 of the secondary sleeve 232, second primary sleeve 248 is slidably mounted, defining an annular chamber 250. The length of the second primary sleeve 248 is slightly less than the length of the portion of secondary sleeve 232 having a diameter 238, allowing the primary sleeve to be slidably movable a quantity $b$ which is arbitrarily chosen to be twice the value of $a$.

The reduced portion 210 of end cap 206 and the first primary sleeve 228 form together the first stage of the device. The first secondary sleeve 232 and the second primary sleeve 248 form together the second stage of the device. The stroke $a$ of the first stage is determined as explained above, by the amount that the sleeve 228 can move until its end strikes the abutment formed by the head 227 of the hollow threaded stop member 226. Sleeve 248 has likewise its amount of travel $b$ stopped when it strikes the abutment of the head 246 of the hollow stop member 244. Five more similar stages are shown within the bore 204 consisting of: sleeves 252–254 with stop member 256 making up the third stage; sleeves 258–260 with stop member 262, the fourth stage; sleeves 264–266 with stop member 268, the fifth stage; sleeves 270–272 with stop member 274, the sixth stage; and sleeves 276–278 with stop member 280, the seventh stage. The third stage has a travel $c$ which is twice the value of $b$; the fourth stage has a travel $d$ which is twice the value of $c$; the fifth stage has a travel $e$ which is twice the value of $d$; the sixth stage has a travel $f$ which is twice the value of $e$; and finally the seventh stage has a travel $g$ which is twice the value of $f$.

The annular chambers 231 corresponding to the first stage, the annular chamber 250 corresponding to the second stage and the annular chambers 253, 259, 265, 271 and 277, corresponding respectively to the other stages up to and including the seventh stage are susceptible to be placed in communication with the pressure supply fluid through the passageways 282, 284, 286, 288, 290, 292 and 294 as controlled by valves 283, 285, 287, 289, 291, 293 and 295. In this fashion, any number of stages may be energized at will, to displace the last sleeve 278 of a quantity which is the sum of the strokes of the individual stages being energized. Last sleeve 278 in turn displaces reaction member 296. Reaction member 296, which is also a lap fit within the main bore 204, has an internal blind bore 299 to clear both the reduced end of sleeve 276 and the head of stop member 280. The other end of reaction member 296 has a reduced diameter 297 defining an annular chamber 298 between it and the main bore 204, and it is slidably guided through a bore in the end cap 300 fastened upon the open end of the housing 200. The end cap has an inner groove with an O-ring seal 301, and an outer groove also with an O-ring seal 302 to prevent leakage of fluid to the outside of the housing, and is fastened on the housing by cap screws or bolts 303 (FIG. 1).

The end of reaction member 296 projecting on the outside has a bore 304 with a thread 306 adapted to receive the threaded end of the output shaft 308.

Annular chamber 298 is filled by supply pressure fluid introduced through passageway 310 from the body of fitting 312. Fitting 312 controls the flow of fluid being admitted to or exhausted from annular chamber 298 by having a restricted calibrated port 314 in communication with channel 316 which in turn communicates with a supply pressure fluid manifold 318 through passageway 320 (FIG. 1). The fluid admitted into the annular chamber 298, pressing upon the area 305 of reaction member 296 biases the stages towards their retracted position. When one or more stages are energized, the pressure fluid admitted into the stages exerts its pressure upon an area which is greater than area 305, thereby forcing the stages to their extended position against the biasing pressure, and some of the fluid contained in annular chamber 298 is exhausted through calibrated port 314. Thus the presence of pressure fluid in annular chamber 298 has a two-fold purpose; it furnishes the means to bias, at all times, the actuator towards its retracted position, and by being forced to pass through the interchangeable calibrated orifice or port 314 during intake to and exhaust from chamber 298, it permits the user to determine the response time of the device according to his requirements.

Reaction member 296 has a groove 322 located substantially in the middle of its larger diameter. This groove defines an annular chamber 324 which is placed in communication with the hollow interior of the device through ports 326. There is thus provided an escape route for any fluid that may leak through to the interior of the device. The interior of the device is drained through passageway 328 to fluid return manifold 330 and returned to the system by conduit 332. In practice, the whole device is filled with this return fluid in order to avoid cavitation.

As indicated above, the first stage has a stroke $a$, the second stage has a stroke $b$ which is twice $a$, and so on to the last stage which has a stroke $g$ which is twice the stroke $f$ of the preceding stage. The device having seven stages, there are 128 discrete positions available for the output shaft from the fully retracted position (position 0, binary 0000000), to the fully extended position (position 127, binary 1111111).

In the embodiment of the invention as shown, fluid pressure means acting upon an area of the last stage bias the actuator toward its retracted position. Other means, such as a coil spring could be used as a biasing means without detracting from the scope and spirit of the invention.

Also any number of stages may be used in the device instead of the seven stages represented and described herein. For instance, an actuator comprising eight stages would give 256 possible discrete positions of the output shaft and an actuator having only five stages would give 32 possible discrete positions.

The device has been shown with a stationary housing and a movable shaft. However, the output shaft could be maintained stationary and the housing could be allowed to move without departing from the scope and spirit of the invention.

Although the illustrated embodiment has been shown with the most significant digit stage connected to the output shaft while the least significant digit stage was connected to the stationary reference, it is obvious that this arrangement could be reversed, or if so preferred, any order of digit stages could be used. It is also obvious that the device could be non-binary, and the ratio between stage strokes could be chosen as best fitting the purpose intended for the apparatus.

It is obvious that, for some special applications, several of such actuators as herein described and illustrated could be placed in series, in opposition or in parallel. For example, the output shaft of one actuator could be connected to the housing of another actuator in order to give a maximum resultant stroke which is the sum of the maximum strokes of each individual actuator. Two housings could be placed back to back or two actuators could be placed in a common housing with two output shafts movable through both ends of the housing.

The above example are given only for illustrative purpose of a few of the possible combinations contemplated and it will be apparent to those skilled in the art that there is a great number of such possible combinations.

It is obvious that various changes, additions and omissions of elements may be made in details within the scope and spirit of the invention; and it is, therefore, to be understood that the invention is not to be limited to the specific details, examples, and embodiment shown and described.

What is claimed is:

1. In a positioner for linearly positioning a movable reference element in relation to a stationary reference element wherein said positioner comprises a stationary housing defining the stationary reference element and having a substantially cylindrical bore closed at one end and open at the other end, a slidable output shaft defining the movable reference element which is movable through the open end of the housing, a plurality of cascaded motor stages slidably disposed end-to-end within the bore in the housing intermediate the closed end of said bore and the output shaft, a source of pressure fluid, valving and conduit means to selectively connect the motor stages to said source of pressure fluid and sealing means for preventing leakage of pressure fluid to the ambient, the improvement characterized by each one of said motor stages comprising:

a first hollow sleeve-like primary member having a first outer diameter end portion adapted to slidably fit in the bore in the housing provided with a transverse end face and a reduced second diameter end portion provided with a transverse outwardly disposed shouldered end face, a further reduced third diameter portion integral with said first hollow sleeve-like primary member and projecting axially from the shouldered end face thereof, said projecting portion having an end portion of diameter slightly larger than said third diameter and defining a transverse inwardly disposed shouldered face a predetermined distance away from said outwardly disposed shouldered end face, said first hollow sleeve-like primary member having an internal diameter within its first outer diameter end portion affording clearance for the end portion of the projecting portion of the primary member immediately preceding, a second hollow sleeve-like secondary member coaxially and slidably disposed around the projecting portion of said first hollow sleeve-like primary member and having a first end having a face normally engaging the transverse outwardly disposed shouldered face of said primary member and a second end having an enlarged outer diameter portion slidable in the bore in the housing provided with an end face normally engaging the end face of the first diameter end portion of the primary member of the next motor stage, said enlarged outer diameter portion defining an annular chamber in the bore of the housing with the outer diameter end portion of said primary member, port means in the bore of the housing for admitting pressure fluid in said annular chamber so as to cause said secondary member to be longitudinally displaced in relation to said primary member, thus displacing all the primary members between said primary member and the output shaft, the maximum travel of each secondary member relatively to the primary member coaxial therewith being limited by stop means defined by said outwardly disposed shouldered end face and by said transverse inwardly disposed shouldered face of the end portion of the projecting portion of said primary member, the first of said primary members being attached to the closed end of the bore in the housing, and the secondary member of the last motor stage displacing directly an output sleeve member fastened to the output shaft, and biasing means exerted upon said output sleeve member in a direction that maintains the motor stages in contact with each other and biases the actuator to is retracted position.

2. The improvement as claimed in claim 1 wherein the biasing means is the pressure fluid acting upon a shoulder area of the output sleeve member situated toward the output shaft, said shoulder area being substantially smaller than the effective area upon which the pressure fluid exerts a force that causes the primary and secondary members of each motor stage to be longitudinally displaced in relation to each other.

3. The improvement as claimed in claim 2 wherein the flow of the pressure fluid providing the biasing means is restricted by being forced to pass through an interchangeable fitting having a calibrated orifice whereby the flow velocity of said fluid is made adjustable by interchanging said fitting with any one of a plurality thereof for providing a plurality of response time periods for the operation of the positioner.

4. The improvement as claimed in claim 1 wherein the means limiting the travel of the secondary member in relation to the primary member of each said motor stage are arranged to provide individual motor stage strokes according to a binary series.

5. The improvement as claimed in claim 1 wherein the end portion of the projecting portion of the primary member is adjustably screwable within a threaded internal portion of said projecting portion.

6. In a positioner for linearly positioning a movable reference element in relation to a stationary reference element wherein said positioner comprises a stationary housing defining the stationary reference element and having a substantially cylindrical bore closed at one end and open at the other end, a slidable output shaft defining the movement reference element and which is movable through the open end of the housing, a plurality of cascaded motor stages slidably disposed end-to-end within the bore in the housing intermediate the closed end of said bore and the output shaft, a source of pressure fluid, valving and conduit means to selectively connect the motor stages to said source of pressure fluid and sealing means for preventing leakage of pressure fluid to the ambient, the improvement characterized by each one of said motor stages comprising:

a first hollow sleeve-like primary member adapted to be slidably disposed in the bore in the housing and being provided with a first and a second end face, a reduced diameter portion integral with said first hollow sleeve-like member and projecting axially from the second end face thereof, said projecting portion having an end portion of diameter slightly larger than said reduced diameter and defining a transverse inwardly disposed end face a predetermined distance away from said second end face, a second hollow sleeve-like secondary member coaxially and slidably disposed around the projecting portion of said first primary member and having a first end face normally engaging the second end face of said primary member, said secondary member having an enlarged outer diameter portion slidable in the bore in the housing and a second end face normally engaging the first end face of the primary member of the next motor stage, said primary member and said secondary member defining an annular chamber in the bore of the housing disposed therebetween, port means in the bore of the housing for admitting pressure fluid in said annular chamber so as to cause said secondary member to be longitudinally displaced in relation to said primary member, thus displacing all the primary members between said primary member and the output shaft, the maximum travel of each secondary member relatively to the primary member coaxial therewith being limited by the second end face of said secondary member abutting against the transverse inwardly disposed end face of the reduced diameter portion of said primary member, the first of said primary members being attached to the closed end of the bore in the housing, and the secondary member of the last motor stage displacing directly an output member fastened to the output shaft, and biasing means exerted upon said output member in a direction that maintains the motor stages in contact with each other and biases the actuator to its retracted position.

7. The improvement of claim 1 wherein the biasing means is the pressure fluid acting upon an area of the output member situated toward the output shaft, said area being substantially smaller than the effective area upon which the pressure fluid exerts a force that causes the primary and secondary members of each motor stage to be longitudinally displaced in relation to each other.

8. In a positioner for linearly positioning a movable reference element in relation to a stationary reference element wherein said positioner comprises a stationary housing defining the stationary reference element and having a substantially cylindrical bore closed at one end and open at the other end, a slidable output shaft defining the movable reference element and which is movable through the open end of the housing, a plurality of cascaded motor stages slidably disposed end-to-end within the bore in the housing intermediate the closed end of said bore and the output shaft, a source of pressure fluid, valving and conduit means to selectively connect the motor stages to said source of pressure fluid and sealing means for preventing leakage of pressure fluid to the ambient, the improvement characterized by each one of said motor stages comprising:

a first hollow sleeve-like member having a first enlarged diameter end portion provided with an end face and adapted to slidably fit in the bore in the housing and a second end portion provided with an end face and a body portion of reduced diameter projecting from said end face, a second hollow sleeve-like member coaxially and slidably disposed around the projecting body portion of said first member, said second member having an enlarged diameter end portion adopted to slidably fit in the bore in the housing and provided with a first end face normally engaging the end face of the second end portion of said first member and a second end face normally engaging the end face of the enlarged end portion of the first member of the next consecutive motor stage, port means for admitting pressure fluid in the space between the enlarged ends of said first and second members of a motor stage so as to expand said motor stage by causing said second member to be longitudinally displaced relatively to said first member, each second member displacing the motor stages between it and the output shaft and the second member of the last motor stage being adapted to displace the output shaft, abutment means dependent from the projecting portion of said first member and adapted to engage a portion of the second end face of the second member so as to limit to a predetermined value the amount of longitudinal displacement of said second member relatively to said first member, and biasing means applied upon the second member of the laste motor stage for maintaining all the motor stages in contact with each other in a contracted condition.

References Cited by the Examiner
UNITED STATES PATENTS

| 2,699,757 | 1/1955 | Tornkvist | 91—167 |
| 2,984,264 | 8/1960 | Freeman | 91—167 |
| 3,072,146 | 1/1963 | Gizeski | 91—167 |

SAMUEL LEVINE, *Primary Examiner.*

EDGAR W. GEOGHEGAN, *Examiner.*

P. T. COBRIN, *Assistant Examiner.*